United States Patent [19]
Choi

[11] Patent Number: 5,132,785
[45] Date of Patent: Jul. 21, 1992

[54] DATA SELECTOR FOR DEMODULATING CHROMINANCE SIGNAL

[75] Inventor: Young-jun Choi, Seoul, Rep. of Korea

[73] Assignee: Samsung Electronics Co., Ltd., Rep. of Korea

[21] Appl. No.: 635,204

[22] Filed: Dec. 28, 1990

[51] Int. Cl.$^5$ .......................... H04N 9/64; H04N 9/77
[52] U.S. Cl. .......................................... 358/40; 358/23
[58] Field of Search ............................ 358/40, 31, 23

[56] References Cited

U.S. PATENT DOCUMENTS

| | | | |
|---|---|---|---|
| 4,307,414 | 12/1981 | Lee | 358/31 |
| 4,415,918 | 11/1983 | Lewis, Jr. | 358/23 |
| 4,594,607 | 6/1986 | Lewis, Jr. et al. | 358/23 |
| 4,700,217 | 10/1987 | Balaban et al. | 358/23 |

FOREIGN PATENT DOCUMENTS 52-70718  6/1977  Japan .................................... 358/40

Primary Examiner—David K. Moore
Assistant Examiner—Wendy R. Greening
Attorney, Agent, or Firm—Leydig, Voit & Mayer

[57] ABSTRACT

A data selector capable of digitally separating I signal components from Q signal components of carrier chrominance signal in a NTSC system. The data selector of the present invention, using the fact that I and Q components of a carrier chrominance signal have mutual phase difference of 90°, drives a first set of buffers to have a phase difference of 90° by a reference clock with a frequency of 4 times that of the carrier frequency, so that the I and Q components are sampled. The outputs of the buffers are output as the I and Q signals through a second set of buffers alternately driven with a frequency of twice that of the carrier frequency. As a result, a chrominance signal demodulator utilizing a simple circuit capable of achieving high speed data processing, miniaturization, and cost reduction can be provided.

6 Claims, 3 Drawing Sheets

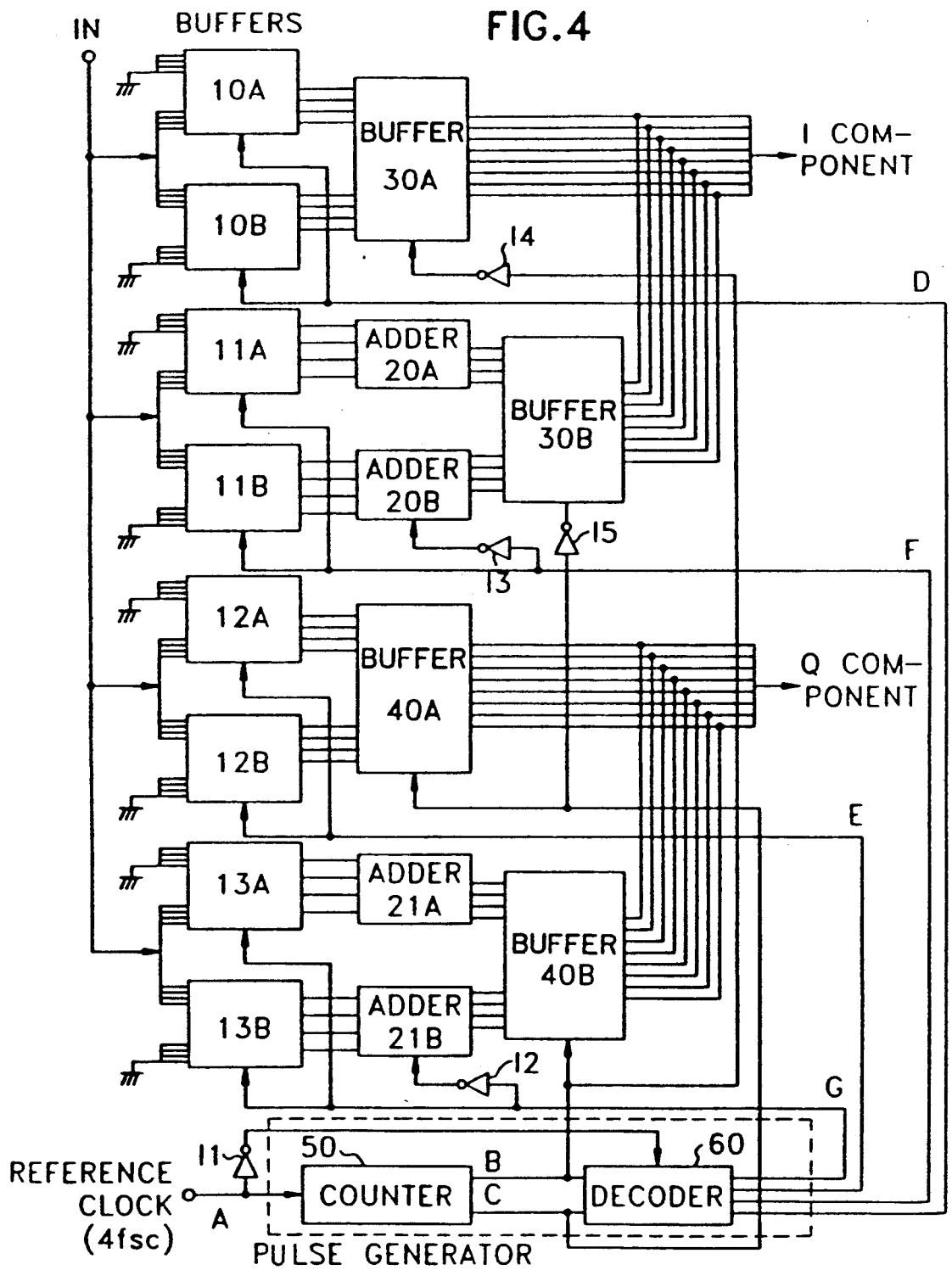

DATA SELECTOR FOR DEMODULATING CHROMINANCE SIGNAL

FIELD OF THE INVENTION

The present invention relates to a data selector for demodulating chrominance signal, and particularly to a data selector capable of digitally demodulating a carrier chrominance signal in a NTSC television system.

BACKGROUND OF THE INVENTION

In a NTSC(National Television System Committee) television system, a video signal is divided into a luminance signal Y and chrominance signals, which comprises an I signal indicating hues and a Q signal indicating saturation, and the two chrominance signals I and Q are then modulated by carrier waves of 3.58 MHz for forming carrier chrominance signal. The carrier chrominance signal is combined with the luminance signal Y, then transmitted to a receiver, and separated from the luminance signal Y therein, and, finally, the I and Q signals are separated from each other to be demodulated.

In formation of such a carrier chrominance signal, the I and Q signals are respectively modulated to I carrier wave ICW and Q carrier wave QCW having mutual phase difference of 90°. Accordingly, in the conventional receiver, the separation of the I and Q signals is generally performed by a so-called synchronous detection, that is, the I carrier wave ICW and Q carrier wave QCW are respectively applied to the carrier chrominance signal as synchronizing signal. Here, to digitally perform the synchronous detection, two digital multipliers are needed for applying the carrier waves ICW and QCW respectively corresponding to the I and Q signals in the conventional system. The use of the multiplier, however, causes problems such as low speed of signal processing, enlarged circuit size, and increase in manufacturing cost.

SUMMARY OF THE INVENTION

Therefore, it is an object of the present invention to provide a data selector as a chrominance demodulator capable of achieving high speed signal processing, miniaturization, and cost reduction, to solve the above described problems of the conventional techniques.

To achieve the object, the present invention provides a data selector for digitally demodulating a carrier chrominance signal including I and Q signals modulated by two carrier waves having mutual phase difference of 90°, comprising:

a plurality of buffers for receiving the carrier chrominance signal and producing outputs, respectively having a phase difference of 90° with respect to the carrier chrominance signal;

a plurality of latches for receiving outputs of the buffers and alternately producing outputs with a frequency of twice that of the carrier waves; and a pulse generator for providing driving signals with the buffers and the latches.

In accordance with the aforesaid constitution, the present invention can provide the chrominance signal demodulator with a simple circuit capable of achieving high speed processing and higher packing density. Therefore, the data selector for chrominance signal demodulation according to the present invention can be widely adopted to digital processing field of video signal such as a digital television, VTR, video telephone, and video conference system.

BRIEF DESCRIPTION OF THE DRAWINGS

The present invention now will be described by way of some embodiments with reference to the attached drawings, in which:

FIG. 4 is a circuit diagram showing another embodiment of the present invention.

DETAILED DESCRIPTION OF THE INVENTION

The basic principle of the present invention utilizes the fact that I and Q signals derived from a carrier chrominance signal modulated by carrier frequency of 3.58 MHz have a mutual phase difference of 90°. Since the carrier frequency is input by a synchronizing frequency fsc during the regeneration of transmitted signals, if the carrier chrominance signal is sampled at 4 fsc, that is, at 14.32 MHz, I and Q signal components having a mutual phase difference of 90° can be separated from each other.

In more detail, the period of the carrier frequency, that is, the period of the synchronizing signal is denoted by Tsc, Tsc is calculated as $Tsc = 1/fsc = 0.28\mu$ sec. As the Q signal component of the carrier chrominance signal is transmitted to be delayed by $\frac{1}{4}\cdot Tsc = 0.07\mu$ sec as compared with the I signal component, the I and Q signals can be separated from each other, when the carrier chrominance signal is sampled by a reference clock of 4·fsc, that is, $\frac{1}{4}\cdot Tsc$.

Figure 1:
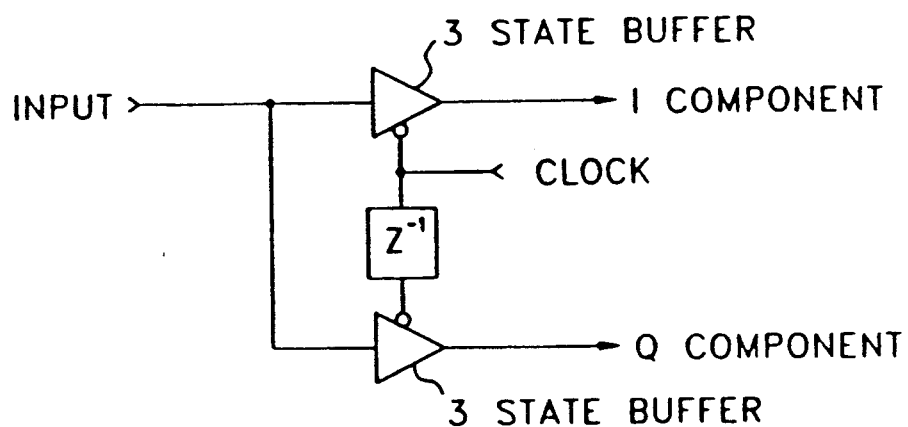
FIG. 1 is a diagram showing the principle of a data selector according to the present invention.

In FIG. 1, after the carrier chrominance signal is A/D converted and the luminance component is separated, the digital carrier chrominance signal is inputted into two tri-state buffering means 3 alternately operated by the reference clock of 4 fsc to have a phase difference of 90°, or, at the driving time difference of $\frac{1}{4}\cdot Tsc$, then is separated into I and Q signal components and outputted. The separated output signals are applied to an unshown digital filter for being filtered. Here, the tri-state buffering means 3 buffers and outputs the inputs only when control clock is applied, and the reference clock preferably has phase delay of 90° with respect to the carrier frequency, that is, the synchronizing frequency fsc.

Figure 2:
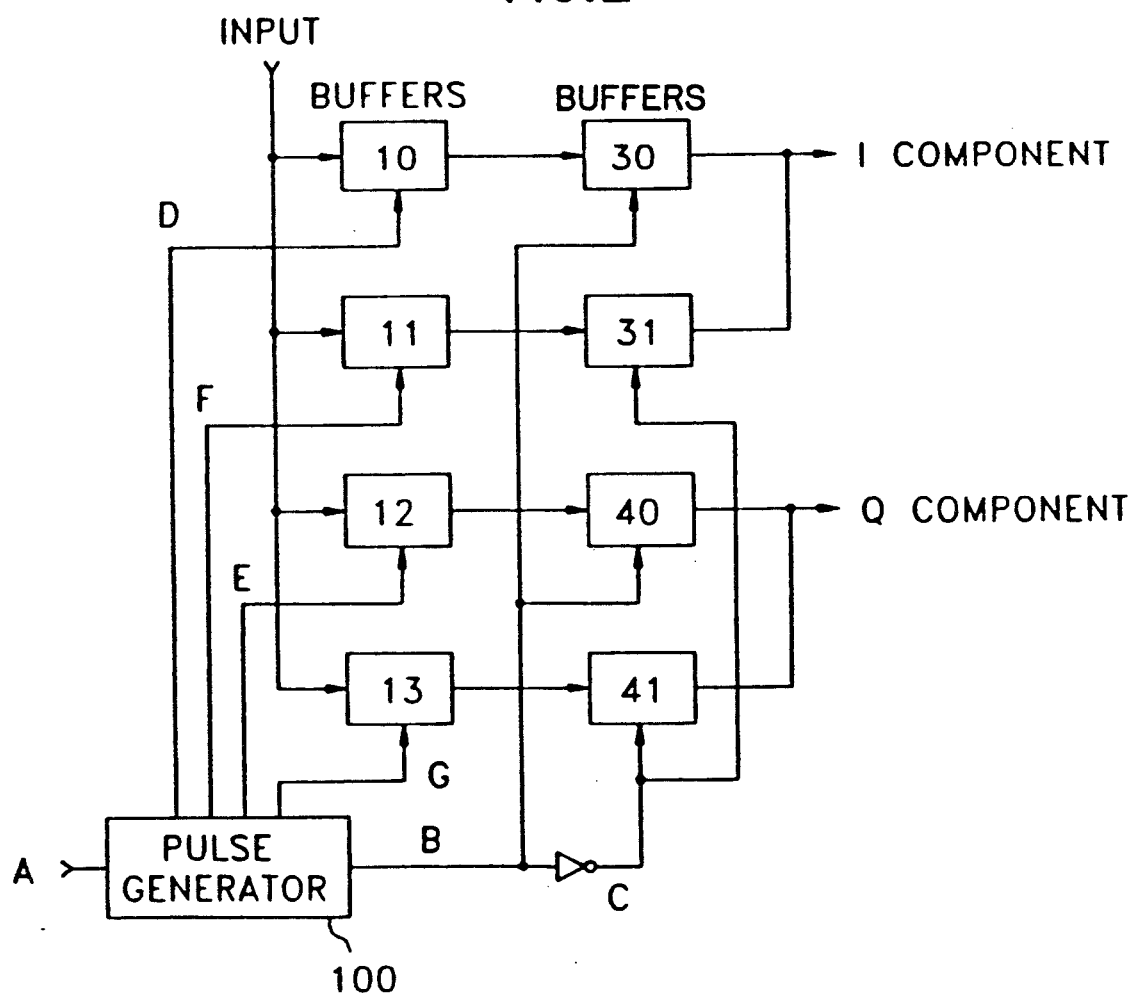
FIG. 2 is a circuit diagram showing an embodiment of the present invention.

FIG. 2 is a block diagram of the data selector adopting the principle illustrated in FIG. 1.

In the drawing, four buffers 10, 11, 12, and 13, each of which is a tri-state buffer, receives A/D converted carrier chrominance signals. The tri-state buffers of the instant invention comprise a TTL device such as a 74LS373 or a 74LS374. To the output terminals of the buffers, a second set of buffers 30, 31, 40 and 41 are respectively connected. The outputs from buffers 30 and 31 are coupled to form the I component of the chrominance signal and the outputs from buffers 40 and 41 are coupled to form the Q component. On the other hand, a pulse generator 100 for supplying a drive timing pulse is connected to control terminals of the buffers and the latches.

Figure 3:
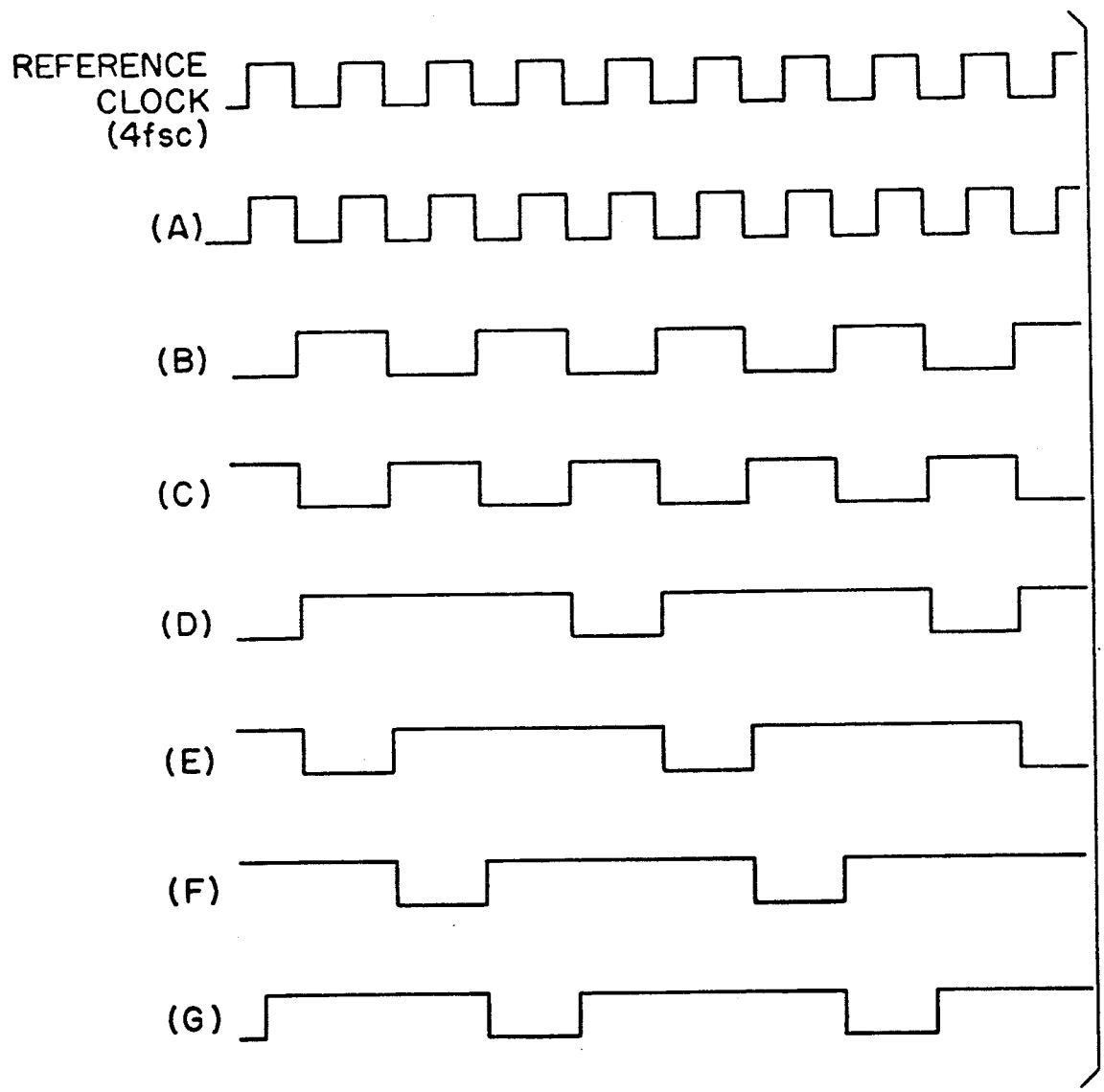
FIG. 3 is a timing chart showing the operation of the device illustrated in FIG. 2.

The pulse generator 100 receives a reference clock signal of 4 fsc, i.e., $\frac{1}{4}\cdot Tsc$, supplied from a reference clock generator (not shown), then applies driving signals D, E, F, and G shown in FIG. 3, to each buffer 10, 11, 12, and 13 by the time delay of ¼·Tsc, and supplies a driving signal B to each buffer 30, 31, 40, and 41 by the period of ½·Tsc. By the operation, driving signals with duration of ¼·Tsc each of which being shifted by 90° is applied to each buffer 10, 11, 12, and 13 by the period of Tsc. Meanwhile, the driving signal B is supplied to the buffers 30 and 40 by the period of ½·Tsc. And a driving signal C is formed by inverting the driving signal B, thus lagged by 180°, and to be supplied to the remaining buffers 31 and 41.

Referring to FIG. 3, the operation of the circuit illustrated in FIG. 3 will be explained.

The carrier chrominance signal containing I and Q signals modulated by carrier waves of 3.58 MHz fsc having mutual phase difference of 90° is A/D converted at a converter (not shown), and then is fed to the circuit. The reference clock of 4 fsc is generated at an oscillation circuit (not shown), thereby supplying the reference pulse A shown in FIG. 3 to the pulse generator 100. Then, the pulse generator 100 produces driving signals D to G to make buffers 10-13 sequentially open in the following order: 10, 12, 11, and 13. By the operation, two-bit signals of the I component are successively sampled and output from the buffers 10 and 11, while two-bit signals of the Q component are successively sampled and output from the buffers 12 and 13, respectively.

On the other hand, the pulse generator 100 supplies the driving signals B and C of 2 fsc to the buffers 30, 31, 40, and 41, to make the buffers 30, 31, 40 and 41 sequentially open in the order of 30, 40, 31, and 41 by the time delay of ¼·Tsc, thereby respectively being latched by the duration of ½ Tsc. Therefore, the outputs of the buffers 10 and 11 are output through the buffers 30 and 31 then added at the junction point to form the I signal component, the outputs of the remaining buffers 12 and 13 are output through the buffers 40 and 41 then added at the junction point to form the Q signal component. The separated I and Q signals are respectively fed to the unshown circuits such as digital filter, where processing takes place. As a result, the digital separation of the I and Q signals is completed.

Another embodiment of the present invention shown in FIG. 4 facilitates processing of an eight-bit input signal. In the embodiment, the data selector comprises a first set of eight tri-state buffers 10A, 10B, 11A, 11B, 12A, 12B, 13A, and 13B and a second set of four tri-state buffers 30A, 30B, 40A, and 40B.

A pulse generator of the embodiment has a counter 50 for generating the output of 2 fsc on receiving the reference clock of 4 fsc, and a decoder 60 for receiving the output of the counter 50, and outputting the driving signals D to G shown in FIG. 3, having a phase difference of 90° with respect to the carrier wave of 3.58 MHz.

In the embodiment of FIG. 4, particularly, adders 20A, 20B, 21A, and 21B are respectively connected between buffers 11A, 11B and 30B, and between buffers 13A, 13B and 40B. The adders are provided for matching with the unillustrated digital filter comprised in following circuits of the present invention, according to the coefficient characteristic. The adders are to form a complementary circuit for functioning the complement conversion to the minus(−) region of the signals applied by phase difference, wherein I and Q signals with plus(+) component are respectively output through the buffers 30A and 40A, and I and Q signals with minus(−) component are respectively complementarily converted at the adders 20A, 20B and 21A, 21B, and are output through the buffers 30B and 40B. Other operations are identical to those of FIG. 2, thus, the repeated description will be omitted.

According to the present invention as explained above, the circuit is simple as compared with the conventional synchronous detection circuit using the multipliers, so that the data selector capable of achieving high speed data processing, miniaturization and cost reduction can be provided. As a result, it can be widely adopted in the chrominance signal demodulator of the NTSC type video signal.

What is claimed is:

1. A data selector for digitally demodulating a carrier chrominance signal including I and Q signals modulated by two carrier waves having mutual phase difference of 90° and separating the carrier chrominance signal into the I and Q component signals comprising:
   a first set of buffers each receiving a carrier chrominance signal and producing an output having a phase difference of 90° with respect to each other;
   a second set of buffers, each buffer in said second set receiving outputs of selected ones of said first set of buffers and sequentially producing outputs with a frequency of twice that of the carrier waves; and
   a pulse generator for providing driving signals for said buffers and said latches.

2. A data selector for demodulating chrominance signals as claimed in claim 1, wherein said selector further comprises a complementary circuit for complementarily converting certain outputs of said first set of buffers.

3. A data selector for demodulating chrominance signals as claimed in claim 1, wherein said pulse generator receives a reference clock of a frequency of four times that of the carrier waves, and supplies driving signals having a mutual phase difference of 90° to said first set of buffers, and supplies driving signals having a mutual phase difference of 180° to said second set of buffers.

4. A data selector for demodulating chrominance signals as claimed in claim 1, wherein each of said first set of buffers is a tri-state buffer which is respectively driven by one of said driving signals.

5. A data selector for demodulating chrominance signals as claimed in claim 1, wherein said pulse generator includes:
   a counter which generates two predetermined outputs having a mutual phase difference of 180° responsive to a reference clock having a frequency of four times that of the carrier waves and supplies the two predetermined outputs as driving signals for said second set of buffers; and
   a decoder which generates four predetermined outputs having a mutual phase difference of 90° responsive to the two outputs from the counter and supplies the four predetermined outputs as driving signals for said first set of buffers.

6. A data selector for digitally demodulating a carrier chrominance signal modulated by two carrier waves having a mutual phase difference of 90° and separating the carrier chrominance signal into I and Q component signals, comprising:
   a first set of buffers each receiving a carrier chrominance signal and producing an output having a phase difference of 90° with respect to an output of selected other buffers of said first set of buffers;

a second set of buffers each connected to at least one buffer of said first set of buffers and each receiving outputs from selected ones of said first set of buffers and sequentially producing an output with a frequency twice that of the carrier wave; and a pulse generator for providing driving signals for said second set of buffers so that each buffers is opened sequentially and the time delay between openings is one quarter of a period of the carrier wave.

* * * * *